July 12, 1960    J. D. WEAVER    2,944,438
CAGING DEVICE
Filed July 9, 1956

*INVENTOR.*
JERALD D. WEAVER
BY
*William R. Lane*
ATTORNEY

United States Patent Office 2,944,438
Patented July 12, 1960

2,944,438
CAGING DEVICE

Jerald D. Weaver, Alhambra, Calif., assignor to North American Aviation, Inc., Downey, Calif.

Filed July 9, 1956, Ser. No. 596,717

4 Claims. (Cl. 74—470)

This invention relates to a caging device and more particularly, to a device to hold the sensitive element of a null-type scientific instrument against movement when said instrument is not operating.

In scientific instruments, such as distance meters which embody floated members to which a torque is applied for nulling during operation, it is necessary that the members be caged during inoperative periods. It is also necessary, in equipment where the instruments are sealed, that the caging and uncaging of the floating member be performed from the exterior of the sealed container. The floating member, when uncaged, generally is adapted to oscillate through a small arc and according to the present invention, the oscillation occurs between two holding arms of the caging device. When the oscillation is to be stopped, the two holding arms are closed against the oscillating member. Their position relative to the portion of the floating member which they hold or cage must be within certain limits, accurate to a few seconds of arc, to properly cage said floating member. This proper caging is made possible by an eccentrically mounted disc in contact with one of the holding arms, said disc also being capable of being operated from the exterior of the instrument case.

Therefore, an object of this invention is to provide an improved caging device.

A principal object of this invention is to provide a caging device which can be fitted into a sealed instrument case and can be installed in or removed from the case without affecting the instrument therein.

Another object of this invention is to provide a caging device adapted to cage a floating or movable member in a definite position to a high degree of accuracy.

It is a further object of this invention to provide a caging device having an externally adjustable fixed stop adapted to align one of the holding members of the device so that the movable member of an instrument can be accurately caged.

Figure 1:
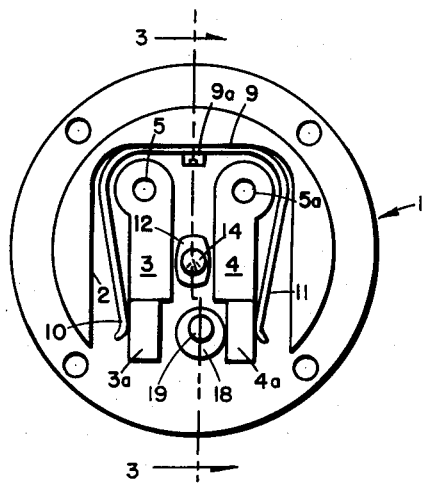
Figure 2:
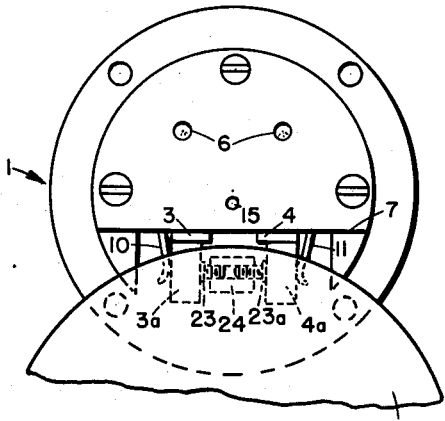
Figure 3:
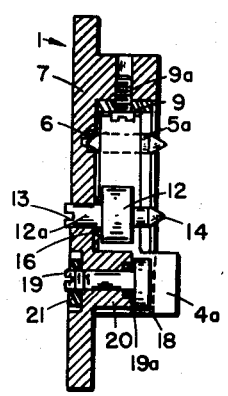

Other objects of invention will become apparent from the following description taken in connection with the accompanying drawings, in which Fig. 1 is a plan view of the device;

Fig. 2 is a plan view illustrating the manner in which the caging device engages a movable member of an instrument;

And Fig. 3 is a sectional view of the device taken along lines 3—3 of Fig. 1.

Referring to Figs. 1–3, the device is fitted in cavity 2 of case 1. Rotatable arms 3 and 4 are mounted on adjacent pivots 5 and 5a inside of cavity 2 so as to be substantially coextensive. The ends of pivots 5 and 5a are conical and seat in suitable miniature bearings 6, such as sapphires, rubies or hard metal, in case 1 and cover plate 7.

Pivoted members 3 and 4 are normally biased in a predetermined, substantially parallel position, shown in Fig. 1, by means of spring 9, which engages the external sides of said members with a pair of arms 10 and 11, respectively. The spring means may be in one piece as shown extending around the arms and fixed to the case by pin 9a, or may be two typical leaf springs attached to the case alongside the arms. Between arms 3 and 4 is a rotatable cam member 12 which provides a means for moving the holding arms against the biasing action of spring 9 and away from each other. Member 12 may be any means, such as a pinion having tangential racks at opposite ends of a diameter, or a wedge, disposed to move the arms from the holding to the non-holding position. Cam shaft 12a of cam 12 has a slotted end portion 13 which extends through case 1 and to the exterior of the instrument case, not shown. This permits cam 12 to be rotated externally of the sealed case. The other end of cam shaft 12a has a conical pivot 14 which is engaged in an aperture or other bearing means 15 located in case cover 7. In the caging device illustrated, which may be used to hold a floating member in a sealed container, gasket seal 16 is compressed between cam 12 and case 1. In such an installation, case 1 would be sealed in an opening in the instrument container, having cover 7 directed inward so that the caged member would fit between arms 3 and 4.

To vary the distance between the arms when they are biased toward each other to properly align them with a floating or movable member, an adjustable stop in the form of a wedge or of an eccentrically mounted cam or disc 18 may be rotatably mounted in case 1, extending between narrowed or inwardly cut away portions 3a and 4a on arms 3 and 4, respectively. Cam 18 is mounted on slotted shaft 19 which extends externally of boss 20 in case 1 and thereby provides a means to turn the stop exteriorly of a sealed instrument. Cam 18 is shown to engage arm portion 4a only. However, by varying its size and shape, it may be made to contact both narrow portions 3a and 4a, if desired for adjustment purposes. Cam 18 may be locked in any adjusted position by means of locking nut 21. A ring or gasket 19a provides a seal around shaft 19 to the exterior of case 1.

In operation, referring to Fig. 2, the caging device may be mounted in the instrument container so that portions 3a and 4a of arms 3 and 4 engage the ends of screws 23 and 23a, respectively, provided in an extended boss 24 which is a part of the floated member 25, shown to be caged. Member 25 may be any sensitive element, such as an armature, which is free to oscillate and which may be nulled by torquing to counteract any disturbing forces. The position of arm 4, when biased by spring 9, is fixed by cam 18 and should be adjusted to hold arms 3 and 4 secure against screws 23 and 23a. While the floated or movable member is so caged, the instrument, such as a distance meter, is inoperative. In order to free member 25 at the time when the air-borne craft, such as a guided missile controlled by said instrument, is launched, cam 12 may be rotated, either manually or by a suitable electronic means, 90° from the position shown in Fig. 1. When cam 12 is rotated, it engages and moves the pivoted arms 3 and 4 outwardly from the ends of screws 23 and 23a against the biasing action of the spring. This frees boss 24 on rotatable member 25 to oscillate between arms 3 and 4, through its required arc of oscillation, and thereby, permits the instrument to perform its controlling functions. At any time when it is desirable to recage member 25, cam 12 may be rotated 90° back to its original position, shown in Fig. 1, to permit spring 9 to move arms 3 and 4 to again cage movable member 25, as shown in Fig. 2.

According to the present invention, the caging device is a complete self-contained unit which may be mounted on and removed from an instrument without affecting the remaining assembled components in the instrument. Further, the device may be externally adjusted without exposing delicate mechanisms of the instrument to the outside atmosphere, and being small and compact, it is adapted for use in caging any internal element of any delicate sealed instrument.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A caging device comprising two holding arms secured in a case, said holding arms being pivotally mounted, a spring abutting and biasing said arms toward each other, first rotatable means adjacent one of said pivoted arms rotatably connected to said case to adjust said last-mentioned arm to vary the distance between said arms when biased by said spring in a holding position, and second rotatable means adjacent said pivoted arms and rotatably connected to said case to move said last-mentioned arms toward said abutting spring into a nonholding position.

2. A caging device comprising two holding members secured in a case, at least one of said members being pivotally mounted, a spring abutting and holding said pivoted member towards the other of said members, said members being substantially parallel, first rotatable means eccentrically mounted in said case connected to adjust said pivoted member to vary the distance between said members when they are spring biased toward each other in a holding position, and second rotatable means adjacent said pivoted member connected to move said pivoted member away from said other member and against said spring into a nonholding position.

3. A caging device comprising two holding arms mounted in a case, each of said arms being mounted at one end thereof on adjacent pivots, a spring abutting and holding said arms toward each other in a holding position, said spring surrounding said pivoted ends of said arms and contacting said arms at points adjacent their other ends, an eccentric disc mounted in said case connected to adjust one of said arms to vary the distance between them when they are in said holding position, and a cam rotatably mounted in said case connected to move said arms away from each other and against said spring into a nonholding position.

4. A caging device comprising two spaced holding arms mounted in a case, each of said arms being mounted at one end thereof on adjacent pivots, a spring extending around said pivoted ends and abutting said arms, said spring connected to hold said arms in a substantially parallel holding position, an eccentric disc rotatably mounted in said case connected to adjust one of said arms to vary the distance between them when they are in said holding position, and a rotatable cam between said arms connected to move them away from each other and against said spring to a nonholding position.

References Cited in the file of this patent

UNITED STATES PATENTS

| | | |
|---|---|---|
| 648,273 | Lindstrom | Apr. 24, 1900 |
| 1,234,334 | Hindman | July 24, 1917 |
| 2,270,951 | Jeffrey | Jan. 27, 1942 |
| 2,285,134 | Williams | June 2, 1942 |
| 2,436,750 | Gray | Feb. 24, 1948 |
| 2,494,313 | Rowe | Jan. 10, 1950 |
| 2,512,902 | Rossire | June 27, 1950 |
| 2,528,967 | Moore | Nov. 7, 1950 |
| 2,531,764 | Binus et al. | Nov. 28, 1950 |
| 2,542,531 | Jeffrey | Feb. 20, 1951 |
| 2,756,610 | Hibbard | July 31, 1956 |
| 2,782,863 | Christy et al. | Feb. 26, 1957 |

FOREIGN PATENTS

| | | |
|---|---|---|
| 1,134,208 | France | Nov. 26, 1956 |